United States Patent [19]

Anthias et al.

[11] Patent Number: 5,606,700

[45] Date of Patent: *Feb. 25, 1997

[54] COMPUTER PROGRAM PRODUCT AND PROGRAM STORAGE DEVICE FOR OBJECT ORIENTED PROGRAMMING PLATFORM

[75] Inventors: Tefcros Anthias, Romsey; Andrew M. West, Winchester, both of England

[73] Assignee: International Business Machines Corporation, Armonk, N.Y.

[*] Notice: The term of this patent shall not extend beyond the expiration date of Pat. No. 5,511,199.

[21] Appl. No.: 478,798

[22] Filed: Jun. 7, 1995

Related U.S. Application Data

[62] Division of Ser. No. 386,193, Feb. 9, 1995, Pat. No. 5,511,199, which is a continuation of Ser. No. 817,856, Jan. 6, 1992, abandoned.

[30] Foreign Application Priority Data

Jan. 18, 1991 [EP] European Pat. Off. ............ 91300413.1

[51] Int. Cl.$^6$ ........................................................ G06F 9/40
[52] U.S. Cl. ............................................ 395/683; 395/500
[58] Field of Search ...................................... 395/500, 600, 395/700, 650

[56] References Cited

U.S. PATENT DOCUMENTS

| | | |
|---|---|---|
| 4,943,932 | 7/1990 | Lark et al. . |
| 5,067,072 | 11/1991 | Talati et al. . |
| 5,095,522 | 3/1992 | Fujita et al. . |
| 5,187,787 | 2/1993 | Skeen et al. . |
| 5,247,650 | 9/1993 | Judd et al. . |

OTHER PUBLICATIONS

Stefik et al., "Object–Oriented Programming: Themes and Variations", *The AI Magazine*, pp. 40–62, 1984.

Krasner, Glenn, "The Smalltalk–80 Virtual Machine", *BYTE*, pp. 300–320, Aug. 1981.

D. Otaway et al., "REX: a remote protocol for object–oriented distributed applications", *7th International Conference on Distributed Computing Systems*, Sep. 1987, Berlin, pp. 113–118.

P. Chrysanthis et al., "The Gutenberg Operating System Kernal", *1986 Proc. Fall Joint Computer Conference*, Nov. 1986, Texas, pp. 1159–1168.

G. Barth, "Programmieren ist nicht gleich Programmieren", *Technische Rundschau*, vol. 79, No. 48, Nov. 1987, pp. 52–57.

T. Chusho et al., "A Multilingual Modular Programming System for Describing Knowledge Information Processing Systems", *Proceedings of the IFIP 10th World Computer Congress*, Information Processing 86, Sep. 1986, pp. 903–908.

*Primary Examiner*—William M. Treat
*Attorney, Agent, or Firm*—Prentiss W. Johnson; Sterne, Kessler, Goldstein & Fox P.L.L.C.

[57] ABSTRACT

A system for allowing a first computer program in a first language to cooperatively process with a second object oriented computer program in another language is described. A generic send message function is interposed between the first and second computer programs to control the exchange of messages. In order to achieve this the generic send message function has access to a description of the classes in the second computer program. Having access to such a description allows the generic send message function to efficiently transfer messages between the different computer programs, and also provides the ability for the creation of new objects of classes spanning environmental boundaries. The description of the object includes data identifying the location of instance variable data for each object, a pointer to class description which includes data identifying the environment in which the class operates, a pointer to any parent class, a list of functions provided by each class, and data identifying the length of instance variable data for each object.

23 Claims, 2 Drawing Sheets ically, it is a powerful aspect of object oriented programming that objects may be organized into a class hierarchy that mirrors the relationships between the objects being modelled. Child classes in the hierarchy inherit the properties of their parents. In a preferred embodiment of the invention said description includes data defining said target class as being a child of a parent class having other target functions which said target object inherits and said generic send message function is responsive to failure to locate said target function in said target class to search for said target function within said parent class.

COMPUTER PROGRAM PRODUCT AND PROGRAM STORAGE DEVICE FOR OBJECT ORIENTED PROGRAMMING PLATFORM

This application is a divisional of application Ser. No. 08/386,193, filed Feb. 9, 1995 now U.S. Pat. No. 5,511,199, which is a continuation of application Ser. No. 07/817,856, filed Jan. 6, 1992, now abandoned.

FIELD OF THE INVENTION

This invention relates to data processing systems. More particularly, this invention relates to the execution of object oriented computer programs on data processing systems.

BACKGROUND OF THE INVENTION

Conventional computer programs comprise a list of instructions which are sequentially executed to manipulate data being processed. It is a time consuming, skilled and expensive task to write computer programs. In order to help reduce these problems, techniques have been developed which seek to assist in enabling the reuse of code between different computer programs. Such object oriented programming techniques divide the code and the data manipulated by the code into portions called objects. The encapsulation of both the code and data makes the objects easier to reuse in differing programs. Execution of such object oriented programs involves the sending of messages between these objects. The objects are organized into hierarchies in which child objects inherit function from their parents. This also reduces the need to write more than one piece of code to perform any given function. One or more objects from one program can be transferred for use in another program.

There are a number of different object oriented programming languages such as Smalltalk and C++ (Smalltalk is a trademark of Digitalk). These various object oriented programming languages have different properties making them suitable for varying purposes. Smalltalk is an interpreted language making it suitable for prototyping as it is easy to modify, but unsuitable as a production language as it is relatively slow in operation. Conversely, C++ is a compiled language making it unsuitable for prototyping as it is difficult to alter, but suitable as a production language as it is fast in operation. All computer languages have both advantages and disadvantages; no one computer language is the best for all purposes. It would be desirable if different parts of a computer program could be written in different languages to better match the circumstances of each portion of code with the language it uses.

With conventional non-object oriented computer programs the task of allowing a computer program in a first language to a cooperatively process with a computer program in a second language would be a complex matter and would require a significant additional overhead. In contrast, object oriented computer programs have a granular or encapsulated structure in which the objects appear to be inherently isolated and independent of one another. The objects normally interact only through the exchange of messages. In theory, this feature should make cooperative inter-language processing easier.

However, in practice, the different object oriented programming languages operate in quite different ways. A message suitable for receipt by an object in one language environment cannot be understood by an object in another language environment. The problem is not one of merely translating the syntax of the message. The way different languages manage the passing of messages between objects vary considerably. One way to enable a first computer program to send a message to a second computer program would require the first computer program to go inside the second computer program to find the information it needs to generate the message. Providing a computer program in a first language capable of going inside a computer program written in another language in search of this information would be a problem of considerable magnitude, and with an accompanying significant overhead. Thus, whilst at first sight the use of object oriented programming techniques would seem to make communication between objects in different languages merely a matter of communicating a message, in practice this is a considerable oversimplification and the difficulties are substantial.

SUMMARY OF THE INVENTION

Viewed from one aspect, the invention provides a method of operating a data processing system under control of a first computer program written in a first computer language and a second object oriented computer program written in a second computer language wherein said first program sends a message to a target object of a target class in said second program to perform a target function by:

said first program calling a generic send message function with access to a predetermined description of classes of sad second computer program, said generic send message function locating said target function from within said target class by reading said description, said generic send message function mapping said message into a format required by said second language, and said generic send message function sending said message to said target object.

The invention allows an object oriented program to be written partly in one computer language and partly in another computer language without the degree of complexity discussed above. The invention introduces an additional layer between the two computer programs. This layer includes a description of the objects in the target computer program. At first appearance it would seem that introducing this additional layer makes the system more, not less complicated. However, the provision of this extra layer allows a language independent object model (description) to be built. The invention recognizes that the provision of this extra layer frees the sending of messages from the complications resulting from the idiosyncrasies of any particular language. The passing of messages between computer programs in different languages is thus made practical.

An example of an application of the invention is where it is desired to create a new version of a computer program by adding additional code. The existing code can remain in its production language such as C++, whilst the new code can be prototyped in a different, more suitable language such as Smalltalk. The invention also makes it possible for class hierarchies to span different languages. A child object in a first language can inherit function from a parent object in a second language. The invention allows working systems to approach more closely the object oriented ideal in which any given object is completely independent of all other object, and can communicate with other objects by sending messages.

It is important to realize that objects within a given class of objects will share most of their characteristics. Accordingly, each object description contains data identifying instance variables unique to that object and a pointer to a description of its class. This organization helps decrease the overall size of the description.

It will be appreciated that in most practical situations it will be desired to send messages in both directions across inter-environment boundaries. Accordingly, in preferred embodiments of the invention said generic send message function has access to a description of objects of a plurality of object oriented computer programs enabling sending messages to said plurality of computer programs.

Within object oriented computer programs a frequent requirement resulting from the inheritance of function is a desire of a child class to send a message to its parent class. In the context of the present invention, that parent object may be within a computer program in a different computer language. To deal with this requirement, in preferred embodiments of the invention said second object oriented computer program includes at least one child class and at least one parent class, each description of a child class includes a pointer to a description of its parent class, and said child class locates its parent class by reading said pointer. This feature of the invention allows for direct calls to be made to a parent class using a SendSuper function.

Another consequence of inheritance is that when a message is sent to a target object, the sending object does not know whether the target object will provide the requested function or will pass the message on to its parent class. To aid efficiency, in preferred embodiments of the invention each description of a class includes a list of functions provided by that class, and if a message requesting a target function not provided by said target class is received, then said pointer to said parent class description is read and said target function searched for in a corresponding list of functions of the parent class. This feature allows the class which deals with the requested function to be identified from within the object descriptions with greater speed.

Another problem that arises is how to achieve a consistent approach to the organization of object instance variable data. To deal with this said description of classes includes data identifying length and location of instance variable data for objects within a given class of objects, such that when a new object is created length of instance variable data for that object is calculated based upon instance variable length for said new object's complete object hierarchy, storage for instance variables is allocated, and instance variable addresses are passed as a parameter in messages sent by said generic send message function to target objects.

As mentioned above message syntax needs to be catered for by the mapping performed by the generic send message function. In preferred embodiments of the invention each description of a class identifies said computer language of said class and a pointer to code for performing said mapping. Only one portion of code need be provided for mapping into each computer language.

Viewed from another aspect the invention provides a data processing system for operation under control of a first computer program written in a first computer language and a second object oriented computer program written in a second computer language having means for sending a message from said first program to a target object of a target class in said second program to perform a target function, said means for sending comprising:

means for said first program to call a generic send message function with access to a predetermined description of classes of said second computer program, means for said generic send message function to locate said target function from within said target class by reading said description, means for said generic send message function to map said message into a format required by said second language, and means for said generic send message function to send said message to said target object.

DETAILED DESCRIPTION OF THE INVENTION

The invention provides inter-operability between different programming language environments across a number of operating system platforms. It provides this inter-operability between different programming languages in a language independent object oriented programming environment. This object oriented programming environment provides a language independent object model.

Figure 1:
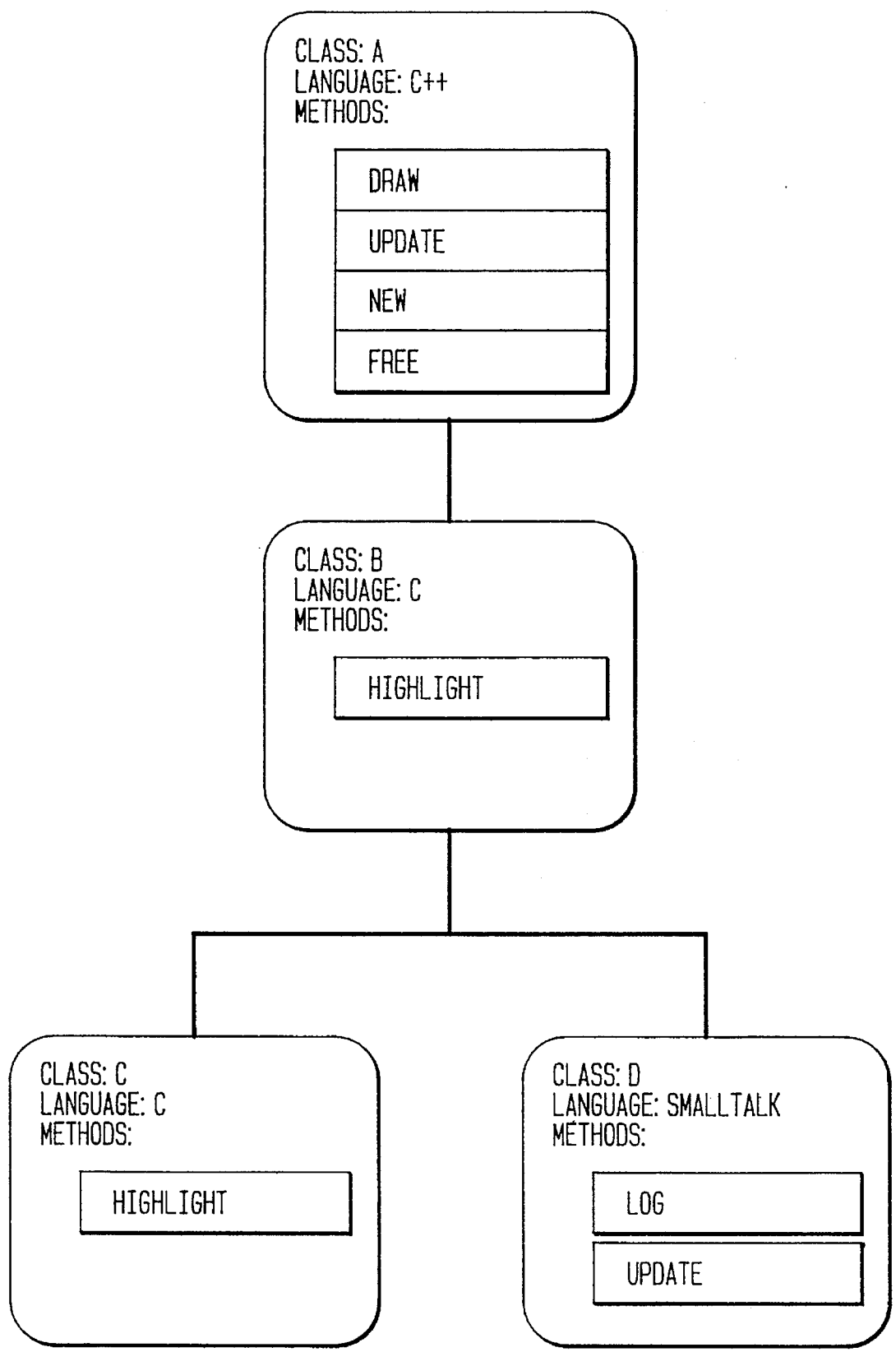
FIG. 1 shows a simple class hierarchy.

One way to demonstrate this is to describe the operation of creating two objects and sending them messages in an OS/2 Presentation Manager environment (OS/2 and Presentation Manager are trademarks of International Business Machines Corporation). This will illustrate the inheritance, instance variable, and language inter-operability functions. The class structure of FIG. 1 is created by a class editor. Each class definition along with its associated tables and methods is compiled and link-edited into a DLL (Dynamic Link Library).

Figure 2:
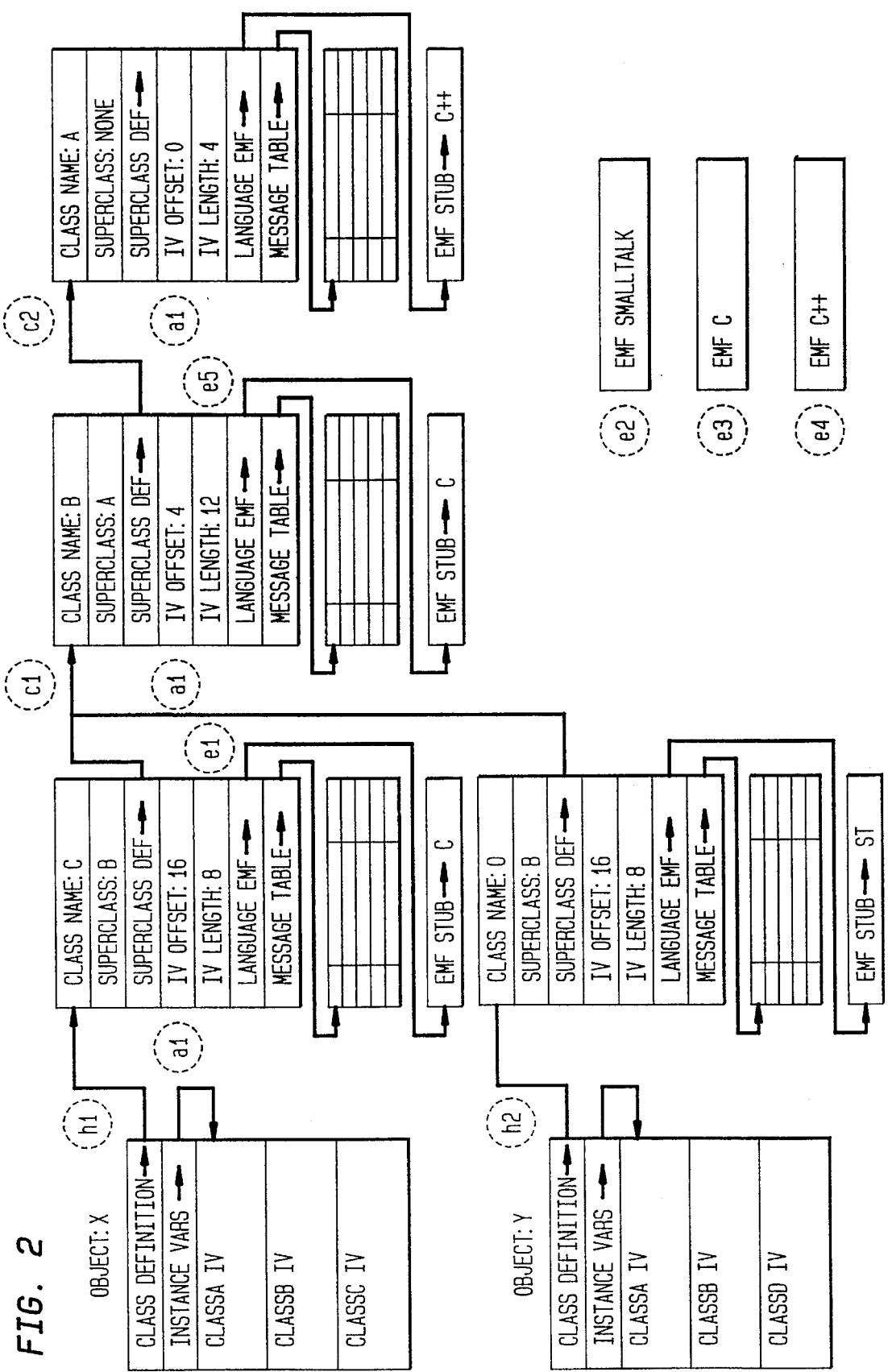
FIG. 2 shows the internal structure and class description (which includes object descriptions) behind this simple class hierarchy.

The first example is the creation of a C object in a hierarchy which also includes a C++ object. Object X (FIG. 2) is created which is an instance of class C.

1. The class C DLL is loaded into memory, and the definition located by sending a message to the Environmental Mapping Function (EMF) stub which returns the address of the class definition. The EMF stub has two entry points "classname" and "_classname" for instance and class messages respectively.

2. Since class C has a superclass B, class B is loaded into memory, and the class definition located, the address of class B's definition being saved in the class C's definition.

3. Similarly step 2 is repeated until all the superclasses in this branch of the hierarchy have been loaded and located, in this case this process stops after loading class A.

4. The length of all the instance variables in this branch of the hierarchy is calculated, in this case 4+12+8 ((a1) in FIG. 2).

5. The object storage is allocated for the instance variables and linkage to the class definition. The address of this storage is used as a generic object handle.

6. A NEW message is sent to the object which allows each class to perform initialization and specialized construction functions. The SendMsg function performs as follows.

a. The SendMsg function obtains the address of the class definition from the object handle, and calls the EMF routine pointed ((c1) in FIG. 2) to by the definition.

b. The 'C' EMF stub routine receives control and the message not being a request for the address of the definition passes control to the 'C' EMF common routine (c3).

c. The 'C' EMF common routine scans the message table associated with this class for the New message, and not finding it calls the EMF routine pointed (c3) to by Class B's definition. The address of Class B's definition is obtained from the superclass definition pointer of Class C's definition (c1).

d. Step c. is repeated until the message is found or the top of the superclass chain is reached. If the top of the superclass chain is reached without finding the message FALSE is returned to the caller of SendMsg.

e. In this case the processing reaches C++ EMF common routine (e4) for Class A. The C++ EMF Common routine performs special processing for the New message. It calls the C++ Class constructor routine whose address is in the message table and saves the value (the C++ handle) returned in the instance variables of the generic message handler (hereafter PMPLUS). This C++ handle is used subsequently when sending messages to a C++ Method.

7. The generic handle is returned to the caller of the object create function.

The second example concerns the creation of a Smalltalk object within a hierarchy which also includes both C and C++ objects. Object Y, an instance of Class D is created. However since the class definitions of Class A and Class B were loaded in steps 2 and 3 in the preceding example these are found and reused. When the Smalltalk EMF common routine (c2) processes the New message it creates a Smalltalk object of this class in the Smalltalk environment. It does this by:

1. A check is made to see if communications are active with the Smalltalk Environment. This is done by obtaining some OS/2 named storage.

2. If this fails Smalltalk is started and communications initialized by:

a. Starting Smalltalk/VPM which in its initialization code allocates the named shared storage and places in the storage the value of the Smalltalk window handle.

b. A PMPLUS message handler object is created which adds itself to the PM Notifier and adds the PMPLUS-Smalltalk messages to be handled by Notifier.

c. Posting a semaphore to inform any waiting environments that initialization is complete.

3. Sends a message to the Smalltalk environment, using the window handle (setup in a) in the shared storage, to create the object. This message is processed as follows:

a. The PMPLUS message handler receives the create object message via Notifier.

b. Checks if the class exists.

c. Creates an instance of the class.

d. Returns an index to this class.

4. The returned index is saved in the PMPLUS instance variables.

5. Processing continues as in the first example steps 6d and 6e.

6. Returns the handle (h2) of Object Y to the caller of the create object function.

The third example illustrates the sending of a message to a C++ object. A draw message is sent to object X. The processing follows very closely the processing described in steps 6a to 6e of the first example except when processing in step 6e, the address of the C++ function is obtained from the message table. The C++ function is called using the C++ handle saved in the PMPLUS instance variables in step 6e in the first example and the parameters from the SendMsg function. The return value from the C++ Method is returned to the caller of the SendMsg function.

The fourth example illustrates the sending of a message to a Smalltalk object. An Update message is sent to Object Y.

1. The SendMsg function obtains the address of the class definition from the object handle, and calls the EMF routine pointed (c2) to by the definition.

2. The Smalltalk EMF common routine receives control and sends the message to the PMPLUS message handler in Smalltalk along with the object index saved in step 4 of the second example.

3. The PMPLUS Smalltalk message handler receives the message and checks that the index is valid and that the object will process the message.

4. If the Object will not process the message a "message not found" indication is returned (to the send message processing) and the search for the message continues up the class hierarchy as in steps 6c and 6d of the first example.

5. Otherwise the parameters are mapped to the Smalltalk environment using message parameter descriptors previously defined and included in the class definition.

6. The Smalltalk message is then executed and the return value passed back to calling function.

7. The Smalltalk method may choose to perform some processing and send the message on to its super class. It does this by using the PMPLUS SendMsgSuper function. All PMPLUS functions are defined in the Smalltalk environment in the same way as the Presentation Manager API is defined.

The SendMsgSuper processing is very similar to the SendMsg function with the exception that the search for the message begins at the superclass of the SendMsgSuper caller, in this case Class B.

The process is then as described in the third example except that the update function is called.

The fifth example describes the sending of a message to a C object. An Highlight message is sent to Object Y.

1. The SendMsg function obtains the address of the class definition from the object handle, and calls the EMF routine pointed (c2) to by the definition.

2. The message is first sent to the Smalltalk Class D as in the fourth example.

3. The message is not handled by the Smalltalk class so the message is sent to the C Language EMF common routine (c3) via Class B's definition.

4. The C Language EMF Common route (c3) finds the highlight message in the Class Definition of Class B.

5. It calculates the address of the Class B's instance variables by adding the instance variable offset to the base address of the instance variable area.

6. The function (whose address is in the message table) is called with the object handle, the address of the instance variables and the parameters from the SendMsg call.

So far we have used the OS/2 environment to describe the operation of this invention, and how the problems of crossing environmental boundaries are solved. More detailed information on OS/2 programming may be found in the book entitled 'Programming the OS/2 Presentation Manager' by Charles Petzold, published by Microsoft Press (ISBN 1-55615-170-5), and on Smalltalk in the manual issued with the Smalltalk/VPM entitled 'Tutorial and Programming Handbook' by Digitalk. An alternative solution for the Smalltalk Environment could be to to use Dynamic Data Exchange (DDE) to obtain the Smalltalk window handle, and use DDE functions for communicating the PMPLUS message handler in Smalltalk.

The solutions developed can be similarly applied to other workstation environments such as Windows, X-Windows, MOTIF, and mainframe operating systems (Windows is a trademark of Microsoft Corporation, X-Windows is a trademark of AT&T Corporation, and MOTIF is a trademark of the Open Software foundation).

What is claimed is:

1. A program storage device readable by a machine, tangibly embodying a program of instructions executable by the machine to perform method steps for performing a target function by sending a message from a first computer program written in a first computer language to a target object of a target class in a second computer program written in a second computer language, said method steps comprising:

locating a predetermined description of said target class;

locating said target function from within said target class by reading said description;

mapping said message into a format required by said second language; and sending said message to said target object.

2. The program storage device of claim 1, said method steps further comprising the method steps of locating a predetermined object description for said target object and reading data identifying instance variables unique to said object and a pointer to a description of an instance variable's class.

3. The program storage device of claim 2, wherein said method steps are performed by a generic send message function means.

4. The program storage device of claim 1, wherein said method steps are performed by a generic send message function means.

5. The program storage device of claim 4, wherein said generic send message function means has access to a description of classes of a plurality of object oriented computer programs enabling sending messages to said plurality of computer programs.

6. The program storage device of claim 5, wherein said second computer program includes at least one child class and at least one parent class, and each description of a child class includes a pointer to a description of its parent class.

7. The program storage device of claim 6, wherein each description of a class includes a list of functions provided by that class, further comprising the steps of determining whether the target function is provided by said target class and if not provided, then reading said pointer to said parent class description and searching said target function in a corresponding list of functions of the parent class.

8. The program storage device of claim 7, wherein each description of objects includes data identifying length and location of instance variable data for objects within a given class of objects, such that when a new object is created length of instance variable data for that object is calculated based upon instance variable length for said new object's complete class hierarchy, storage for instance variables is allocated, and instance variable addresses are passed as a parameter in messages sent by said generic send message function to target objects.

9. The program storage device of claim 8, wherein each description of a class identifies said computer language of said class and a pointer to code for performing said mapping.

10. A computer program product for use in a computer system, said computer program product comprising:

a computer readable medium having computer readable program code means embodied in said medium for causing a computer to perform a target function by sending a message from a first computer program written in a first computer language to a target object of a target class in a second computer program written in a second computer language, the computer system having a processor, said computer program readable program code means comprising:

computer readable program code means for locating a predetermined description of said target class;

computer readable program code means for locating said target function from within said target class by reading said description;

computer readable program code means for mapping said message into a format required by said second language; and computer readable program code means for sending said message to said target object.

11. The computer program product of claim 10, further comprising computer readable program code means for locating a predetermined object description for said target object and reading data identifying instance variables unique to said object and a pointer to a description of an instance variable's class.

12. The computer program product of claim 11, wherein the computer readable program code means are performed by a generic send message function computer readable program code means.

13. The compute program product of claim 12, wherein the computer readable program code means performed by a generic send message function computer readable program code means.

14. The computer program product of claim 13, wherein the generic send message function computer readable program code means has access to a description of classes of a plurality of object oriented computer programs enabling sending messages to said plurality of computer programs.

15. The computer program product of claim 14, wherein said second computer program includes at least one child class and at least one parent class, and each description of a child class includes a pointer to a description of its parent class.

16. The computer program product of claim 15, wherein each description of a class includes a list of functions provided by that class, further comprising computer readable program code means for determining whether the target function is provided by said target class and if not provided, then reading said pointer to said parent class description and searching said target function in a corresponding list of functions of the parent class.

17. The computer program product of claim 16, wherein each description of objects includes data identifying length and location of instance variable data for objects within a given class of objects, such that when a new object is created length of instance variable data for that object is calculated based upon instance variable length for said new object's complete class hierarchy, storage for instance variables is allocated, and instance variable addresses are passed as a parameter in messages sent by said generic send message function instruction means to target objects.

18. The computer program product of claim 17, wherein each description of a class identifies said computer language of said class and a pointer to code for performing said mapping.

19. A computer program product for uses in a computer system, said computer program product comprising:

a computer usable medium having computer readable program code means embodied in said medium for causing a computer to pass messages between a first object oriented program, written in a first object oriented programming language, and a second object oriented program, written in a second object oriented programming language, said computer readable program code means comprising:

computer readable program code means for causing said computer system to store a description of one or more classes in said second in said second object oriented program;

computer readable program code means to implement a generic send message means having access to said description; and computer readable program code means for causing an object oriented computer program to send a message, adopting a first message protocol corresponding to said first object oriented programming language, to said second object oriented program by accessing said generic send message means, wherein said message is mapped to a second message protocol, corresponding to said second object oriented programming language.

20. The computer program product of claim 19, wherein said second object oriented computer program further has an object description for one or more objects, said object description further has data identifying one or more instance variables unique to said one or more objects and a pointer to said class description.

21. The computer program product of claim 20, wherein said second object oriented computer program further has one or more child classes and one or more parent classes, wherein each description of a child class includes a pointer to a description of its parent class, and each said child class locates its parent class by reading said pointer.

22. The computer program product of claim 19, wherein said description of one or more classes further comprises a list of functions provided by that class such that if a message requests a function not provided by a child class, said pointer to said description of said parent class of said child class is read and said function is searched for in a corresponding list of functions in said description of said parent class of said child class.

23. The computer program product of claim 19, wherein said class description further comprises data identifying length and location of instance variable data for said objects, such that when a new object is created, storage required for instance variable data for said new object is calculated based upon instance variable length for said new object's complete hierarchy, storage for said instance variables is allocated, and addresses of said instance variables are stored.

* * * * *